United States Patent Office 3,752,847
Patented Aug. 14, 1973

3,752,847
FLUORINATED ESTERS OF POLYCARBOXYLIC ACIDS
James C. Fletcher, Administrator of the National Aeronautic and Space Administration, with respect to an invention of Laurence W. Breed, Overland Park, Kans., and Richard L. Elliott, Kansas City, Mo.
No Drawing. Filed Sept. 23, 1971, Ser. No. 183,240
Int. Cl. C07c 69/42
U.S. Cl. 260—485 F                                                    4 Claims

ABSTRACT OF THE DISCLOSURE

Fluorine-containing esters of polycarboxylic acids having the formula

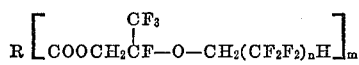

where R is a saturated hydrocarbon radical of 2 to 20 carbon atoms having only one carboxy group attached to any one carbon atom, $m$ is a whole number of 2 to 4 and $n$ is a whole number of 1 to 5. Esters embodying the invention are useful for extreme-temperature lubricants and base fluids for greases.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435, 42 USC 2457).

BACKGROUND OF THE INVENTION

This invention relates to fluorinated esters of polycarboxylic acids and to lubricating compositions based on the same.

Improved lubricating fluids are needed for applications involving service at extreme temperatures, and in particular for lubrication of equipment in cryogenic liquid or gaseous oxygen systems. In addition to physical properties amenable to extreme temperature service, namely, liquidity over a wide temperature range along with a minimum pour point and a low evaporation rate, lubricant base fluids for such applications should exhibit a high degree of hydrolytic stability and a low reactivity with metals under stress conditions. Further requirements include absence of impact sensitivity in the presence of liquid or gaseous oxygen and effective lubricity.

Considerable progress toward meeting the above requirements has been realized by means of structural modification of organic liquids to provide fluorine substitution at selected sites in the molecule. Fluorine substitution in general renders organic liquids more stable and less susceptible to oxidative reactions. Fully fluorinated compounds, however, present disadvantages in their high pour points, high volatility and high viscosity indexes. One approach to obtaining improved lubricant properties has involved the synthesis of partially fluorinated structures which incorporate heteroatoms in the molecule. Various partially fluorinated liquids have been disclosed by previous workers, including fluorine-containing esters of polycarboxylic acids as described in U.S. Pats. 3,081,342; 3,124,533; 3,223,726; and 3,096,363. While the previously available fluorinated esters exhibit favorable properties in many respects, further improvements are needed, and in particular decreased pour points and lower evaporation rates, consistent with hydrolytic stability, good wear properties and amenability to thickening.

SUMMARY OF THE INVENTION

The present invention is directed to fluorine-containing esters of polycarboxylic acids having the formula

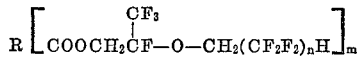

where R is a saturated hydrocarbon radical of 2 to 20 carbon atoms having only one carboxy group attached to any one carbon atom, $m$ is a whole number of 2 to 4 and $n$ is a whole number of 1 to 5. Esters of this formula, exemplified by the bis(polyfluoroalkyloxy tetrafluoropropyl) 3-methylglutarates, show favorable overall properties for use as lubricants in cryogenic oxygen-containing systems.

It is therefore an object of this invention to provide improved lubricants for extreme-temperature use.

Another object is to provide fluorine-containing esters of polycarboxylic acids which have decreased pour points and low evaporation rates.

Still another object is to provide lubricant liquids having a minimum reactivity with liquid or gaseous oxygen.

Yet another object is to provide fluorinated esters characterized by their hydrolytic stability, good wear properties and amenability to thickening.

A further object is to provide a method of preparing such esters.

Other objects and advantages of the invention will be apparent from the following detailed description.

DESCRIPTION OF THE PREFERRED EMBODIMENT

Fluorine-containing esters of the formula given above can be prepared by reaction of a saturated carboxylic acid with a 2-polyfluoroalkyloxytetrafluoropropanol having the formula

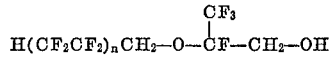

where $n$ is a whole number from 1 to 5. Preferred propanol compounds are those in which $n$ is equal to 2 or 3. The propanol reactant can be prepared by condensing hexafluoropropylene oxide with a polyfluoroalkyl alcohol in the presence of sodium hydroxide to form a 2-polyfluoroalkyloxytetrafluoropropionic acid and reducing the acid with sodium borohydride in tetrahydrofuran.

Polycarboxylic acids which can be used for preparation of esters embodying the invention may be represented by the formula $R(COOH)_m$ where R is a saturated hydrocarbon radical of 2 to 20 carbon atoms having only one carboxy group attached to any one carbon atom and $m$ is a whole number of 2 to 4. The saturated hydrocarbon radical may be acyclic or alicyclic (containing a carbocyclic ring) including alkyl substituted carbocyclic hydrocarbon. Examples of saturated polycarboxylic acids which can be used include 3-methylglutaric acid, 2-methylglutaric acid, 3,3-dimethylglutaric acid, 2,2-dimethylglutaric acid, $d$-camphoric acid, and tricarballylic acid. 3-methylglutaric acid is preferred.

Reaction of the polycarboxylic acid, or a functional derivative thereof such as the anhydride, with the 2-polyfluoroalkyloxytetrafluoropropanol can be carried out by conventional esterification techniques wherein a mixture of the reactants is heated in a solvent in the presence of a strong acid catalyst. It is preferred to heat the mixture under reflux conditions in toluene, using a sulfuric acid catalyst, with water being removed as the solvent refluxes. The product can be purified and recovered by dissolution in ether, washing with water and potassium carbonate and drying, followed by fractional distillation. Other purification methods such as solvent extraction or absorption of impurities can also be used.

Example I

2-ψ'-heptyloxy-2,3,3,3-tetrafluoropropanol-1, formula

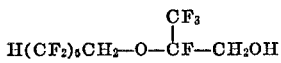

was prepared by condensing hexafluoropropylene oxide with ψ'-heptyl alcohol to form 2-ψ'-heptyloxytetrafluoropropionic acid and reducing the acid with sodium borohydride in tetrahydrofuran.

A mixture of 17.4 grams (0.034 mole) of the 2-ψ'-heptyloxytetrafluoropropanol, 2.75 grams (0.019 mole) of 3-methyl glutaric acid, 0.07 gram of sulfuric acid and 16 milliliters of toluene was refluxed for 20 hours. 0.9 milliliter (calcd. 0.7 ml.) of water was collected in a Dean-Stark trap. The residue was cooled, dissolved in 100 ml. of ether, washed sequentially with 100 ml. portions of water, 10% potassium carbonate and water, and dried over sodium sulfate. Fractional distillation gave 15.7 grams (81%) of bis(2-ψ'-heptyloxytetrafluoropropyl) 3-methylglutarate, B.P. 180–184° C. (0.5 mm.), $n_D^{20}$ 1.3478. Analysis calculated for $C_{26}H_{18}F_{32}O_6$ (percent): C, 30.19; H, 1.75; F, 58.78. Found (percent): C, 30.09; H, 1.89; F, 59.04.

In a second preparation using the above procedure with 21 ml. of toluene, 3.65 grams (0.025 mole) of 3-methylglutaric acid, 23.1 grams (0.050 mole) of 2-ψ'-heptyloxytetrafluoropropanol and 0.07 gram of sulfuric acid, 21.6 grams (84%) of bis(2-ψ'-heptyloxytetrafluoropropyl) 3-methylglutarate, boiling at 169–171° C. (0.2 mm.), $n_D^{20}$ 1.3488, $$d_{27}^{27} 1.668$$

was obtained.

Additional properties of the fluorine-containing ester product were determined as follows: Pour point, −50° F.; viscosity 47.95 cst. at 100° F., 5.08 cst. at 210° F.; lubricity of the ester containing 2 weight percent tricresyl phosphate (four-ball wear scar diameter, 50 kilogram load, 2 hours at 147° F. and 600 revolutions per minute) 0.4 millimeter; hydrolytic stability (milliliter 1 N NaOH/mole) 3.81; evaporation rate (percent at 300° F., one hour) 1.36; reactivity to aluminum under shear (1,500 revolutions per minute, 1000 pounds per square inch, for one minute), no reactions in 6 trials; and impact sensitivity with liquid oxygen (MSFC–SPEC–106B, "Testing Compatibility of Materials from Liquid Oxygen Systems," Marshall Space Flight Center, impact energy 10 kg.-meters), no reactions in 20 trials.

Example II

2-ψ'-pentyloxy-2,3,3,3-tetrafluoropropanol-1, formula

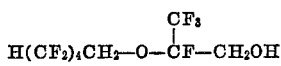

was prepared by condensing hexafluoropropylene oxide with ψ'-amyl alcohol in the presence of sodium hydroxide to form 2-ψ'-pentyloxytetrafluoropropionic acid and reducing the acid with sodium borohydride in tetrahydrofuran.

A mixture of 13.5 grams (0.037 mole) of the 2-ψ'-pentyloxytetrafluoropropanol, 2.72 grams (0.019 mole) of 3-methylglutaric acid, 0.07 gram sulfuric acid and 15 milliliters of toluene was refluxed for 18 hours. 0.8 milliliter (calcd. 0.7 ml.) of water was collected in a Dean-Stark trap. The residue was cooled, dissolved in 100 ml. of ether, washed sequentially with 100 ml. portions of water, 10 percent potassium carbonate and water, and dried over sodium sulfate. Fractional distillation gave 12.4 grams (80%) of bis(2-ψ'-pentyloxytetrafluoropropyl) 3-methylglutarate, B.P. 151–153° C. (0.3 mm.), $n_D^{20}$ 1.3550. Analysis calculated for $C_{22}H_{18}F_{24}O_6$ (percent): C, 31.67; H, 2.17; F, 65.65. Found (percent): C, 31.78; H, 2.27; F, 54.97.

In a second preparation using the above procedure with 5.3 grams (0.036 mole) of 3-methylglutaric acid, 26.5 grams (0.074 mole) of 2-ψ'-pentyloxytetrafluoropropanol, 0.14 gram of sulfuric acid and 30 ml. of toluene, 25.9 grams (85%) of the fluorinated ester boiling at 144–146° C. (0.1 mm.), $n_D^{20}$ 1.3548, $$d_{27}^{27} 1.603$$

was obtained.

Additional properties of the product ester were determined as follows: pour point, −65° F.; viscosity, 33.83 cst. at 100° F., 4.02 cst. at 210° F.; hydrolytic stability (milliliter 1 N NaOH/mole) 1.65; evaporation rate (percent at 300° F., 1 hour) 4.78; reactivity to aluminum under shear (1500 revolutions per minute, 1000 pounds per square inch, for one minute), no reactions in six trials; and impact sensitivity with liquid oxygen (MSFC–SPEC–106B) one reaction in 20 trials.

It may be seen from the above that fluorinated esters embodying the invention exhibit excellent overall properties for use as lubricants, in particular, their wide range of liquidity, hydrolytic stability, low evaporation rate and minimum reactivity with oxygen, as well as effective lubricity. The esters can be used as lubricant oils without additive modification. However, best results are obtained by incorporating a small amount, ½ to 5 weight percent, and preferably 2 weight percent, of an antiwear additive such as tricresyl phosphate in the ester. Grease-like compositions can be obtained by addition of thickeners such as a fluorocarbon telomer dispersion (available under the trade name Vydax 1000) preferably at proportion of 15 to 20 weight percent. In addition to their use as lubricants, esters embodying the invention are useful for other applications requiring high stability and low volatility, for example, as fluids for transmission of heat and power.

It is understood that the preceding examples are merely illustrative and are not to be construed as limiting the scope of the invention. Various changes and modifications in the procedures given above can be employed by one skilled in the art without departing from the invention.

What is claimed is:

1. A fluorine-containing ester having the formula

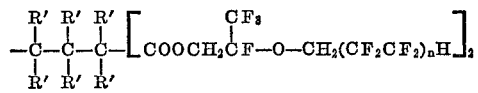

where $n$ is a whole number of 1 to 5 and R' is a hydrogen atom or a methyl radical, at least one and no more than two of said R' symbols representing methyl radicals, and, for esters having two methyl radicals represented thereby, both of said methyl radicals being linked to the same carbon atom.

2. A fluorine-containing ester having the formula

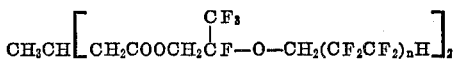

where $n$ is a whole number of 1 to 5.

3. The ester of claim 2 wherein $n$ is 2.
4. The ester of claim 2 wherein $n$ is 3.

References Cited
UNITED STATES PATENTS 3,096,363   7/1963   Ballard et al. _____ 260—485

LORRAINE A. WEINBERGER, Primary Examiner

E. J. SKELLY, Assistant Examiner

U.S. Cl. X.R.

252—49.9, 54.6; 260—468 K